Aug. 21, 1962     M. W. PARSONS, JR     3,049,963
OPTICAL INSTRUMENT IN THE NATURE OF A SURVEYING TRANSIT
Filed June 30, 1959     2 Sheets-Sheet 1
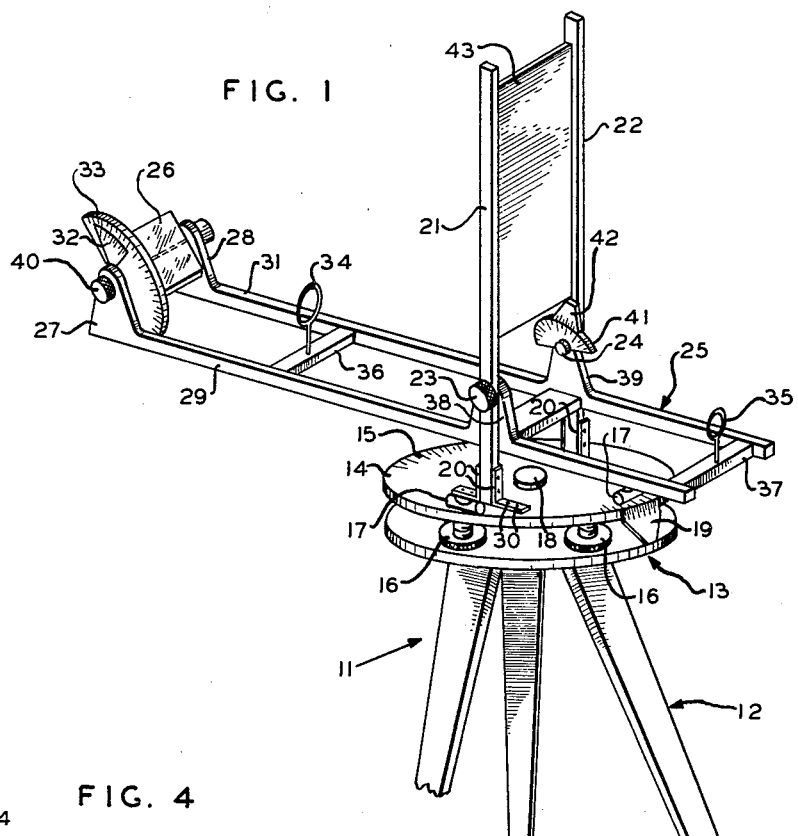
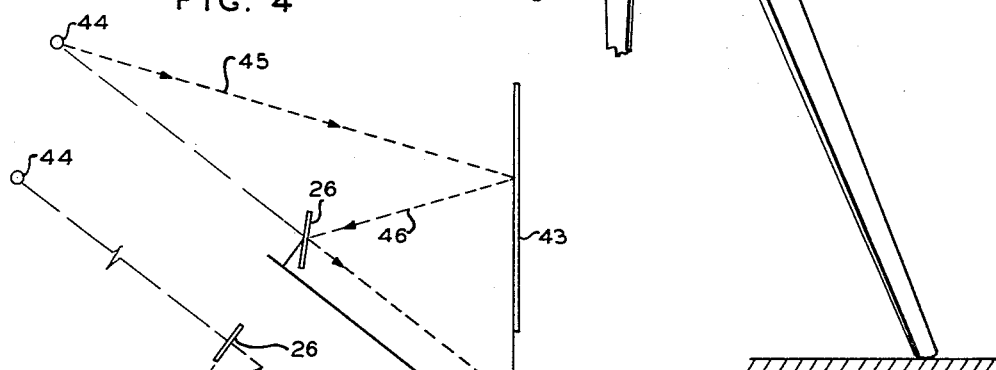
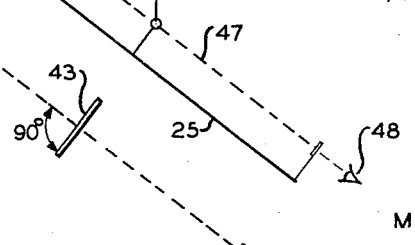
INVENTOR.
M.W. PARSONS, JR.
BY
ATTORNEY

INVENTOR.
M.W. PARSONS, JR.

United States Patent Office 3,049,963
Patented Aug. 21, 1962

3,049,963
OPTICAL INSTRUMENT IN THE NATURE OF A SURVEYING TRANSIT
Mahlon W. Parsons, Jr., 18 Gull Road, Middletown, N.J.
Filed June 30, 1959, Ser. No. 824,064
6 Claims. (Cl. 88—2.4)

This invention relates to optical instruments and, more particularly to one simultaneously obtaining angular measurements and having a base of selected length for determining the height, horizontal distance and azimuth of a fixed or moving object with respect to the location of the instrument. It employs reflecting mirrors arranged and manipulated to make it possible for an observer to view the object either by double reflection between said mirrors or directly side by side with such double reflection.

An object of my invention is to provide an instrument by means of which distances may be quickly and accurately established with the minimum of calculation by the user.

Another object of my invention is to devise an instrument in the nature of a surveyor's transit which dispenses with any elaborate system of optics and movable parts and which may be operated by an unskilled user under most weather conditions.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a perspective view of a portion of an instrument embodying my invention.

FIGURE 2 is a diagrammatic end elevational view of the top member of the leveling plate means, supporting standards of modified form projecting thereabove, the sighting arm, the means defining a line of sight parallel to and above said arm, the normally vertical relatively large mirror disposed directly above the horizontal axis of the sighting arm, and the relatively small mirror pivoted about a normally horizontal axis adjacent the end of the sighting arm opposite the observer.

FIGURE 4 is a fragmentary diagrammatic view, generally corresponding to FIGURE 3, but showing parts of my instrument moved to position for sighting on an object.

FIGURE 5 is a view corresponding to FIGURE 4, but showing the parts in plan to indicate that the movable mirror intercepts light which comes direct from the object being viewed, so that only an image of said object is seen by the observer.

Figure 2:
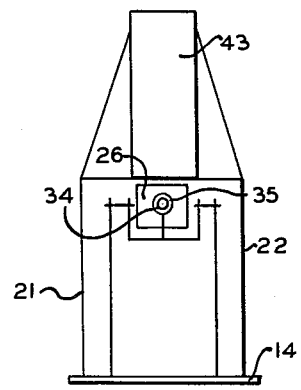
Figure 3:
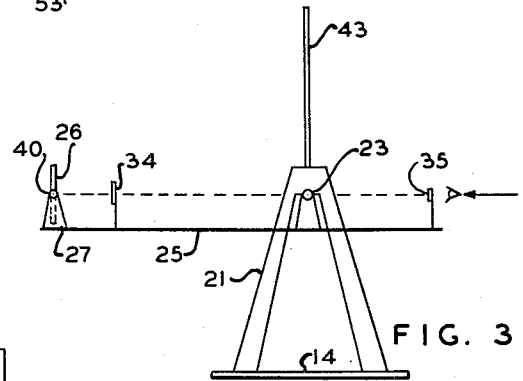
FIGURE 3 is a side elevational view from the left of the parts shown in FIGURE 2.

Referring to the drawings in detail, and first considering FIGURES 1, 2 and 3, there is shown an embodiment of my instrument generally designated 11, showing a support such as a tripod 12 on the upper end of which is mounted leveling plate means 13, including a normally horizontal upper limb or member 14 with an angularly graduated circle or portion 15, similar to that on a surveying transit, for measuring the azimuth or horizontal angular rotative movement of said upper member 14 with respect to the portion of the leveling plate means 13 therebeneath. Means, such as leveling screws 16, are disposed between the upper and lower plates of the leveling plate means 13 are accurately leveling the upper member 14 upon setting up the instrument. Said member 14 desirably carries spirit levels, indicated at 17, to show when it is accurately leveled. A normally vertical pivot member 18 passes through the parts of the plate means 13, allowing for rotation of the upper member about a normally vertical axis with respect to the tripod 12. A conventional pointer or vernier, diagrammatically indicated at 19, is desirably employed to show the angular position of the graduated portion 15.

Extending from the upper surface of the horizontal member 14 are standards or pedestals 21 and 22, shown in FIGURE 1 as connected to said member by angular brackets 20 and associated connecting means, such as screws or rivets 30. Between said pedestals is mounted, on normally horizontal pivot members 23 and 24, a sighting arm 25 having a relatively long portion extending to the left, as viewed in FIGURE 1 and carrying a relatively small adjustable plane mirror 26 as on a shaft 40. The mirror 26 is pivoted about a horizontal axis between standards 27 and 28 upstanding from the horizontally spaced portions 29 and 31 of the sighting arm. Means are provided for adjusting or turning the mirror 26 on its supporting shaft and indicating the relative angular portion of said mirror with respect to the standards 27 and 28. Such indicating means may take the form of a pointer 32 on one of the parts, and an angularly graduated arcuate disc 33 on the other. The pointer 32 is desirably in the form of a conventional vernier for accurately measuring angles.

Carried by the sighting arm 25 are means defining a line of sight parallel to and above said arm. Said means, as illustrated in FIGURE 1, comprise sighting rings 34 and 35, the axis therethrough intersecting the horizontal pivoting axis of the mirror 26 and the ring 35 remote from said mirror being adjacent the end of the short section of the sighting arm convenient to the eye of an observer. These rings may be carried on cross pieces 36 and 37 between the spaced portions 29 and 31. If desired, a telescope (not shown) may be substituted for the sighting rings 34 and 35.

The sighting arm 25 desirably carries upstanding pedestal portions 38 and 39 which respectively receive the pivot members 23 and 24. One of said portions, such as 39, desirably carries an angularly graduated arcuate normally vertical disc 41 movable with the arm, along a pointer or vernier carried by the pedestal 22, to show the angularity of movement of the arm 25 in a vertical plane. Above the vernier 42, the pedestals 21 and 22 carry, desirably demountably, a relatively large plane mirror 43 facing the mirror 26. The mirror 43 is aligned directly above the axis of the pivot member and fixed against angular movement, except turning about a vertical axis with the sighting arm 25.

In a practical embodiment of my invention, there are preferably a number of additional refinements. For example, the horizontal upper member 14 is desirably large enough, say from 22 inches to 24 inches in diameter, to provide a stable base for the standards 21 and 22 supporting the vertical mirror 43 and the cradled sighting arm 25. The calibrated or angularly graduated portion 15 and associated vernier are desirably such that readings to 10 seconds may be made.

The horizontal sighting arm 25 is desirably set approximately 4 inches below its horizontal axis. The distance between said horizontal axis and the horizontal axis of the mirror 26 is made some known convenient distance, such as 30 inches, such distance being made the basis for calculations to be later discussed. The sighting rings 34 and 35 may be replaced by a telescope for sighting on distant fixed objects. They are aligned precisely along the sighting arm axis. The mirror 26 is also the same 4 inches or other distance above the sighting arm, corresponding to the distance said arm is set below its horizontal axis. Clamps and tangent screw controls are employed for accurately setting the vertical angle of the sighting arm 25 and the angle of the mirror 26 from the perpendicular to the plane of said arm when reflecting the image of the objective from the mirror 43.

The vertical mirror 43 should be positioned directly over the horizontal axis of the sighting arm 25 and fixed in truly vertical position when attached to the standards and when the upper member 14 is set truly horizontal. It remains fixed in relation to the horizontal axis as the plate 14 is rotated. The bottom of the mirror 43 is desirably approximately 7 inches above the horizontal axis of the sighting arm, approximately 8 inches wide and 20 inches in height or vertical length. On account of the manner of mounting the parts, the mirror 43 because of its relatively large size can be conveniently positioned so as to obtain either single vision of the objective or angled in order to secure both the direct vision of the objective and the reflected image in the mirror 43 to obtain both of these images side by side, as viewed in FIGURE 8.

The horizontal axis of the mirror 26 is a fixed precise distance from the horizontal axis of the sight line, as previously explained, such distance being the basis for all calculations. Experiments indicate that this mirror should be about 6 inches square and the calibrated arcuate disc 33 for mirror positioning should read to 5 seconds. This mirror 26 may be rotated on its horizontal axis by means of a tangent screw, not shown, to reflect the image of an object from the mirror 43 to the observer's eye adjacent the short end of the sighting arm 25.

Figure 8:
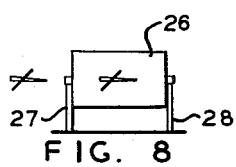
FIGURE 8 is a diagrammatic view illustrating the double view of the object when using the instrument according to FIGURES 6 and 7.

If the plane of the mirror 43 intersects the horizontal axis of the sighting line at right angles as viewed in plan, and the mirror 26 is in the direct line of sight with its axis normal to said line, the objective will be kept directly in back of the mirror 26, resulting in single vision or observation by mirror reflection. However, it is believed that more precise results will be obtained if both mirrors, 43 and 26, are positioned so that the actual objective and its reflected image can be seen simultaneously by the observer, as illustrated in FIGURE 8. In sighting fixed objects, a telescope could be carried on the horizontal axis, similar to a surveyor's transit.

As seen in FIGURES 4 and 5, when the axes of both mirrors 43 and 26 art set in plan view normal to the sighting line, the objective 44 is kept in back of the mirror 26 and said mirror is rotated on its horizontal axis until the reflected image from the mirror 43 is centered on the mirror 26 and reflected back to the observer's eye. This view is along the line 45 to the mirror 43 and from there along line 46 to the mirror 26, and finally along line 47 to the observer's eye 48, as shown most clearly in FIGURES 4 and 5.

Figure 6:
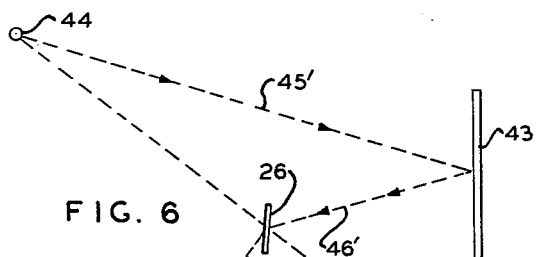
FIGURE 6 is a view corresponding to FIGURE 4, showing an alternative use for the instrument in which the sighting arm is moved through a small horizontal angle so that the object under observation may be seen directly side by side with that viewed by reflection in the mirrors.
Figure 7:
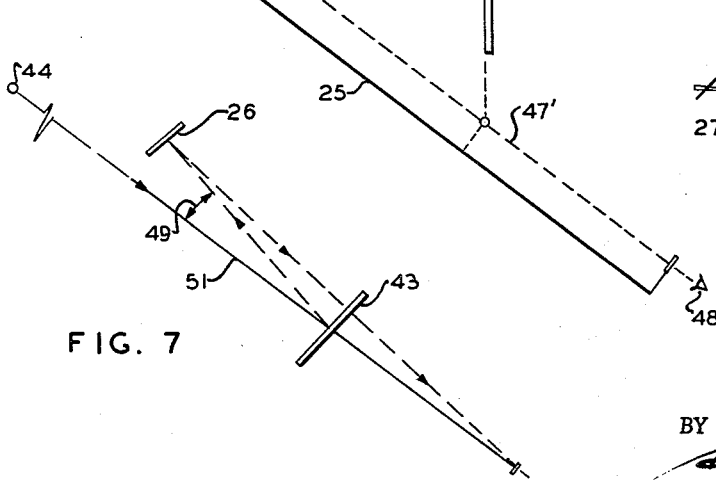
FIGURE 7 is a view corresponding to FIGURE 6 but showing the parts in plan.

However, if the center line of the mirror 26 is offset through a horizontal angle 49, as viewed in FIGURE 7, on an arc with the axis of the pivot member 18 as the center, then by calculation and positioning, the mirror settings of the incidence angles would complement each other to result in the mirror 26 reflecting an image of the objective to the observer's eye longitudinally offset from that which the observer would see directly, as shown in FIGURE 8. Thus light from the objective 44 would pass along line 45', be reflected by the mirror 43 along line 46' to the mirror 26, from which it would be reflected to the observer's eye 48 along line 47', as shown in FIGURES 6 and 7.

The light directly from the object to the observer's eye would pass along line 51, lying at an angle to the lines 45', 46' and 47', as viewed in plan, FIGURE 7. It will be observed that in this case the mirror 43 is not normal to the direct sight line, but said sight line would still intersect the center line of both mirror 43 and the horizontal axis suspending the sighting arm 25.

Figure 9:
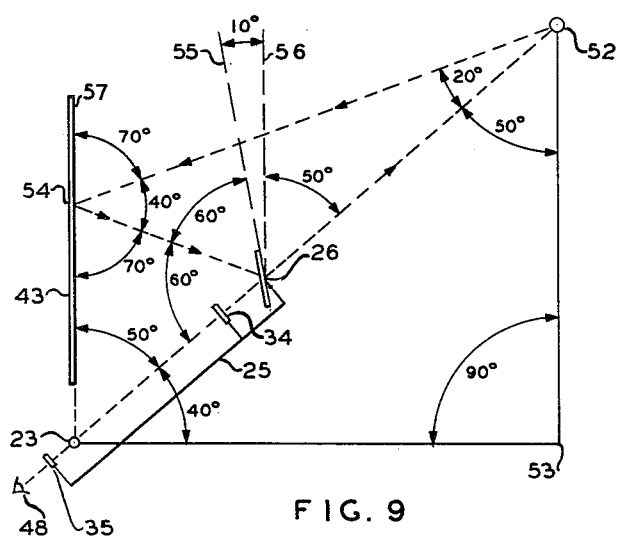
FIGURES 9 is a diagram to show how calculations are made after taking a reading with the instrument, as an example of the use to which said instrument may be put.

Referring now to FIGURE 9 which illustrates how to calculate distances with the use of my instrument, assume an object 52 is sighted through the rings 34 and 35 after moving the sighting arm 25 so that the line of sight makes a certain angle with the horizontal. Suppose this is read on the disc 41 as 40°. This means that the angle between the line of sight and the mirror 43 is 50°. As one arm in the triangulation of FIGURE 9, we have the distance between the pivot 23 and the center of the mirror 26 assumed equal to 30 inches as an example. The quantities sought are the horizontal distance from the pivot 23 to a point 53 directly beneath the object 52, which may, as an example, be an airplane. We also desire the vertical distance from the object 52 to the point 53 directly therebeneath.

To obtain these quantities, we may resolve the triangulation illustrated in FIGURE 9 in the following steps:

(1) The angle 23—52—54, the latter point being where the line of sight of the object 52 impinges on the mirror 43 en route to the observer's eye 48, equals twice the angle 55—26—56. The latter angle is the deviation of the mirror 26 from the vertical and can be obtained from a reading of the graduated discs 33 and 41.

(2) The angle 23—54—26 equals the angle 54—23—52, plus twice the angle 55—26—56.

(3) The angle 57—54—52 equals the angle 23—54—26, as both are reflected incidence angles.

(4) The angle 26—54—52 equals 180° minus the reflected incidence angles.

(5) The angle 23—54—52 equals the sum of the angles determined under (3) and (4) above.

(6) The angle 54—26—52 equals 180° minus the sum of the angle 26—54—52 and the angle 54—52—26.

(7) The angle 23—26—54 equals 180° minus the sum of the angles 26—23—54 and 26—54—23.

Step I in the solution to find the distance desired. The distance between the points 54 and 26 in the triangle 54—26—23 is found, by knowing the distance between the points 23 and 26, from the law of sines.

Step II. The length of the line 26—52 is then found, knowing the angles in the triangle 26—54—52.

Step III. The distance 23—52 is merely the length of the line 26—52 plus the length of the line 23—26, which in the embodiment considered is 30 inches.

Step IV. The horizontal distance 23—53 is equal to the distance 23—52 times the cosine of the angle 52—23—53 which, in the example considered, is 40°. The vertical distance 53—52 is the sine of the same angle times the distance 23—52.

An alternative solution is to find the length of the line 23—54 by the law of sines, knowing the length of the line 23—26. Then find the length of the line 23—52 in the triangle 23—54—52, knowing the length of one side and the necessary angles. The final step in the solution in finding the lengths of the lines 23—53 and 53—52 is the same as in Step IV of the previous solution.

Another method of determining the distance between 54 and 52 involves using the distance 23 to 54 as a base line. This distance could be read on a calibrated vertical scale set on one edge of the mirror 43, by means of a movable sliding pointer set coincident with the object image in mirror 26 and then fixed in position so the distance could be accurately read after the instrument had been locked.

This procedure would minimize the steps in calculating distance 54 to 52, but would at the same time introduce more chance of error in accuracy since distance 23 to 54 would in some cases constitute a base line shorter than the sighting arm 23 to 26. In brief, as the horizontal angle of the sight line lowers, distance 23 to 54 decreases.

From the foregoing, it will be seen that I have devised an instrument which may be used to conveniently measure distance to and altitudes of fixed or moving objects after a quick visual reading. My instrument, in a practical form, would include means for measuring angles to 5 seconds of arcs, except for azimuth angles which could be 10 seconds, means for counterbalancing the sighting arm 25, a vertical mirror 43 desirably demountable for transportation convenience, the employment of tangent screws and clamping devices where they can be conveniently manipulated from the observer's end of the sighting line, and a sighting arm 25 which is demountable. The verniers should be so placed that readings may be taken from the observer's or short end of the sighting arm. The clamping device for the sighting arm in any position must be firm. After placing a target in line, further adjustment for trapping the target would be with tangent screws.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departure from the scope and spirit of the invention, as set forth in the following claims.

Having thus described the invention, what is claimed is:

1. An optical instrument in the nature of a transit comprising a normally horizontal member supported for rotation about a vertical axis, means for leveling said member, a sighting arm supported above said horizontal member and pivoted with respect thereto about a normally horizontal axis, a normally vertical mirror disposed directly above the horizontal axis of said sighting arm and on the vertical axis of said horizontal member, another mirror mounted adjacent the free end of said sighting arm and adjustable about a normally horizontal axis to reflect the image of a relatively distant object from the normally vertical mirror to an observer's eye adjacent the other end of said sighting arm, means for showing the angularity of the sighting arm with respect to the horizontal, and means for showing the angularity of said other mirror with respect to the sighting arm.

2. In an optical instrument as recited in claim 1, angular graduations on top of said horizontal member, and a vernier associated with said graduations for accurately reading azimuth angles.

3. In an optical instrument as recited in claim 2, an angularly graduated disc associated with said other mirror, and a vernier associated with said graduations for accurately reading the angular position of said mirror.

4. In an optical instrument as recited in claim 1, an angularly graduated disc associated with the sighting arm, and a vernier associated with said disc for accurately reading the angular position of said arm.

5. An optical instrument in the nature of a transit comprising a tripod, a normally horizontal member supported on said tripod for rotation about a vertical axis, means on said tripod for leveling said member, a sighting arm supported above said horizontal member and pivoted with respect thereto about a normally horizontal axis, means defining a line of sight parallel to and above said arm, a normally vertical relatively large mirror disposed directly above the horizontal axis of said sighting arm and on the vertical axis of said horizontal member, a relatively small mirror mounted adjacent the free end of said sighting arm a selected distance from the axis of said sighting arm and adjustable about a normally horizontal axis to reflect the image of a relatively distant object from the relatively large mirror to an observer's eye adjacent the other end of said sighting arm, and means for showing the angularity of the sighting arm with respect to the horizontal and the angularity of the relatively small mirror with respect to the sighting arm.

6. An optical instrument in the nature of a surveying transit comprising a tripod, means including a normally horizontal plate with a graduated portion of measuring horizontal angles supported on said tripod for rotation about a vertical axis, means for leveling said plate, a sighting arm supported above said horizontal plate and pivoted with respect thereto about a normally horizontal axis, means defining a line of sight parallel to and above said arm, a normally vertical relatively large mirror disposed directly above the horizontal axis of said sighting arm and on the vertical axis of said horizontal member, a relatively small mirror mounted adjacent the free end of said sighting arm and adjustable about a normally horizontal axis to reflect the image of a relatively distant object from the relatively large mirror to an observer's eye adjacent the other end of said sighting arm, and means for showing the angularity of the sighting arm with respect to the horizontal and the angularity of the relatively small mirror with respect to the sighting arm, the horizontal axis of said relatively small mirror being positioned a selected distance from the horizontal axis of said sighting arm as a basis for use in determining distances after obtaining the triangulation between the line of sight to an object under observation and the lines of reflection to and from said mirrors, both directly parallel to the sighting arm and diagonally as a reflection, in the relatively small mirror, of the image in the relatively large mirror.

References Cited in the file of this patent

UNITED STATES PATENTS

| | | |
|---|---|---|
| 765,493 | Koscinski | July 19, 1904 |
| 1,945,323 | Lewis | Jan. 30, 1934 |
| 2,627,779 | Szelwach | Feb. 10, 1953 |